(12) United States Patent
Shimizu

(10) Patent No.: US 12,294,491 B2
(45) Date of Patent: May 6, 2025

(54) INFORMATION PROCESSING APPARATUS, INFORMATION PROCESSING SYSTEM, UPDATE METHOD, AND NON-TRANSITORY COMPUTER-READABLE MEDIUM IN WHICH PROGRAM IS STORED

(71) Applicant: NEC Corporation, Tokyo (JP)

(72) Inventor: Atsushi Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/283,865

(22) PCT Filed: Mar. 30, 2021

(86) PCT No.: PCT/JP2021/013498
§ 371 (c)(1),
(2) Date: Sep. 25, 2023

(87) PCT Pub. No.: WO2022/208648
PCT Pub. Date: Oct. 6, 2022

(65) Prior Publication Data
US 2024/0171461 A1 May 23, 2024

(51) Int. Cl.
*H04L 41/082* (2022.01)
*H04L 41/0803* (2022.01)
(Continued)

(52) U.S. Cl.
CPC ........ *H04L 41/082* (2013.01); *H04L 41/0803* (2013.01); *H04L 41/0806* (2013.01); *H04L 41/084* (2013.01); *H04L 41/16* (2013.01)

(58) Field of Classification Search
CPC ... H04L 41/082; H04L 41/16; H04L 41/0806; H04L 41/0803; H04L 41/0813; H04L 41/084; H04L 41/0823
See application file for complete search history.

(56) References Cited

U.S. PATENT DOCUMENTS 9,893,940 B1 * 2/2018 Chawla ................. H04L 41/082
2021/0144056 A1 * 5/2021 Chakrapani Rangarajan .............
H04L 41/5012

FOREIGN PATENT DOCUMENTS

CN 110377298 A * 10/2019 ............... G06F 8/65
JP 2020-502650 A 1/2020
(Continued)

OTHER PUBLICATIONS

International Search Report for PCT Application No. PCT/JP2021/013498, mailed on Jul. 6, 2021.
(Continued)

*Primary Examiner* — Rachel J Hackenberg

(57) ABSTRACT

An information processing apparatus, an information processing system, an updating method, and a program that can properly update software even when a network function has a redundant configuration are provided. An information processing apparatus (1) includes: an information acquiring unit (2) configured to acquire redundant configuration information contained in network definition information from a MANO implementation apparatus performing instantiation of network functions by using the network definition information that contains the redundant configuration information being information about a redundant configuration of the network functions, and implementing MANO for the network functions; and an update control unit (3) configured to propose an update sequence of nodes in updating software of the nodes that execute processing for providing the network functions, based on the redundant configuration information.

20 Claims, 6 Drawing Sheets

(51) Int. Cl.
    *H04L 41/0806*   (2022.01)
    *H04L 41/084*    (2022.01)
    *H04L 41/16*     (2022.01)

(56) References Cited

FOREIGN PATENT DOCUMENTS

| | | |
|---|---|---|
| JP | 2020-523679 A | 8/2020 |
| WO | 2016/121802 A1 | 8/2016 |
| WO | 2020/252337 A1 | 12/2020 |

OTHER PUBLICATIONS

ETSI GS NFV-IFA 011 V4.1.1 (Nov. 2020), "Network Functions Virtualisation (NFV) Release 4; Management and Orchestration; VNF Descriptor and Packaging Specification", Nov. 2020.

ETSI GS NFV-IFA 011 V3.3.1, "Network Functions Virtualisation (NFV) Release 3; Management and Orchestration; VNF Descriptor and Packaging Specification", Sep. 30, 2019.

ETSI GS NFV-REL 006 V3.1.1, "Network Functions Virtualisation (NFV) Release 3; Reliability; Maintaining Service Availability and Continuity Upon Software Modification", Feb. 2018.

\* cited by examiner

New Attribute of the Vdu information element

| Attribute | Qualifier | Cardinality | Content | Description |
|---|---|---|---|---|
| redundantInstance | O | 0...1 | Boolean | Identifier of redundancy configuration for VNFC. If that is specified, all of instantiated VNFC by the VDU are addressed as 1+ N redundancy. |

Fig. 3

New attributes of the VNFDf information element

| Attribute | Qualifier | Cardinality | Content | Description |
|---|---|---|---|---|
| geoRedundancy | O | 0...1 | Boolean | Identifier of geo redundancy configuration in different NFVI. If that is specified, the following Attributes need to be configured. |
| geoRedundancyVNFdid | O | 1 | Identifier | Identifier of VNFD that were already used for the instantiation or will be used to specify the redundancy between different NFVIs. |

Fig. 4

INFORMATION PROCESSING APPARATUS, INFORMATION PROCESSING SYSTEM, UPDATE METHOD, AND NON-TRANSITORY COMPUTER-READABLE MEDIUM IN WHICH PROGRAM IS STORED

This application is a National Stage Entry of PCT/JP2021/013498 filed on Mar. 30, 2021, the contents of all of which are incorporated herein by reference, in their entirety.

TECHNICAL FIELD

The present disclosure relates to information processing apparatuses, information processing systems, updating methods, and non-transitory computer-readable medium storing a program.

BACKGROUND ART

When updating software, the impact on the system should be considered. In this regard, Patent Literature 1 discloses a method for performing software updates for a plurality of cloud gateways. In this method, the ranking of cloud gateways is determined according to the danger of a connected automation solution, and updates are initiated from the cloud gateway with the lowest danger.

By the way, as the scale of the Private Cloud, which is a platform, grows with the scale of services, the number of servers (also called Worker Nodes or Compute Nodes) that host Workloads continues to increase. As a result, the total number of servers in all data centers (Data Centers) can reach several hundred or greater. On the other hand, when updating a platform for maintenance of security, software EOL (End of Life), or introduction of new features, service continuity of VNF (Virtual Network Function) or NS (Network Service), which is a service composed of a plurality of VNFs, needs be considered. The VNFs are deployed in any data centers and worker nodes in a configuration with regional redundancy and intra-data center redundancy, but the deployment destination may be changed at any time through Orchestration by a MANO (Management and Orchestration). In order to update the platform software (that is, worker node software) while continuing VNF services, worker nodes used in a redundant configuration of the NSs or the VNFs must not be stopped at the same time. Therefore, as the number of VNFs increases, it becomes more difficult to determine the update sequence.

References related to the present disclosure include Non-Patent Literature 1. Non-patent literature 1 discloses the specification of VNF descriptor.

CITATION LIST

Patent Literature

PTL1: Published Japanese Translation of PCT International Publication for Patent Application, No. 2020-502650

Non Patent Literature

NPTL1: ETSI GS NFV-IFA 011 V4.1.1 (2020-11) "Network Functions Virtualisation (NFV) Release 4; Management and Orchestration; VNF Descriptor and Packaging Specification", November 2020

SUMMARY OF INVENTION

Technical Problem

In Network Functions Virtualization Infrastructure (NFVI), numerous worker nodes exist. Therefore, it is very costly to manually calculate the update sequence for each software update, taking into account information about the NS or VNF deployment destination. In addition, this needs to be done for all data centers individually, which induces operational errors. Furthermore, the deployment destination may be arbitrarily changed by Healing, Scaling, and the like through orchestration by the MANO.

Here, a centralized updating approach using Templates or Scripts and a control apparatus can be considered for worker node software updating to reduce costs and improve work quality. In this approach, the templates or scripts are prepared with the necessary descriptions for updating, and the necessary files are deployed. This allows for achievement of the ordering of any worker nodes, the exclusion of specific nodes, and the like, and still allows for updates to be performed while suppressing the orchestration by the MANO. However, even with such a technology, in order to implement the update in consideration of the redundant configuration of the NSs or the VNFs and service continuity, surveys must be conducted in advance and plans need to be made meticulously and manually as to which worker nodes will be updated, when, and how.

Furthermore, since templates or scripts are created by specifying each worker node according to the plan, there is a possibility of human error, which is not sufficient in terms of improving work quality.

In addition, the technology disclosed in Patent Literature 1 described above do not consider updating systems with a redundant configuration.

Therefore, one of the objects that the example embodiments disclosed herein seek to achieve is to provide an information processing apparatus, an information processing system, an updating method, and a program that can properly update software even if the network function has a redundant configuration.

Solution to Problem

An information processing apparatus according to a first aspect of the present disclosure includes:
  an information acquiring means for acquiring redundant configuration information contained in network definition information from a Management and Orchestration (MANO) implementation apparatus performing instantiation of network functions by using the network definition information that contains the redundant configuration information being information about a redundant configuration of the network functions, and implementing MANO for the network functions; and
  an update control means for proposing an update sequence of nodes in updating software of the nodes that execute processing for providing the network functions based on the redundant configuration information.

An information processing system according to a second aspect of the present disclosure includes:
  a MANO implementation apparatus configured to perform instantiation of network functions by using network definition information that contains the redundant configuration information being information about a redundant configuration of the network functions, and implement MANO for the network functions; and an information processing apparatus, in which
the information processing apparatus includes:
an information acquiring means for acquiring the redundant configuration information contained in the network definition information from the MANO implementation apparatus, and
an update control means for proposing an update sequence of nodes in updating software of the nodes that execute processing for providing the network functions based on the redundant configuration information.

An updating method according to a third aspect of the present disclosure includes
acquiring redundant configuration information contained in network definition information from a MANO implementation apparatus performing instantiation of network functions by using the network definition information that contains the redundant configuration information being information about a redundant configuration of the network functions, and implementing MANO for the network functions, and proposing an update sequence of nodes in updating software of the nodes that execute processing for providing the network functions, based on the redundant configuration information.

A program according to a fourth aspect of the present disclosure, causing a computer to execute,
an information acquiring step of acquiring redundant configuration information contained in network definition information from a MANO implementation apparatus performing instantiation of network functions by using the network definition information that contains the redundant configuration information being information about a redundant configuration of the network functions, and implementing MANO for the network functions, and
an update control step of proposing an update sequence of nodes in updating software of the nodes that execute processing for providing the network functions, based on the redundant configuration information.

Advantageous Effects of Invention

According to the present disclosure, information processing apparatus, information processing systems, updating methods, and programs that can properly update software even if the network functions have a redundant configuration can be provided.

BRIEF DESCRIPTION OF DRAWINGS

FIG. 3 is a table showing examples of redundant configuration information;

FIG. 4 is a table showing examples of the redundant configuration information;

EXAMPLE EMBODIMENT

Overview of Example Embodiment

Figure 1:
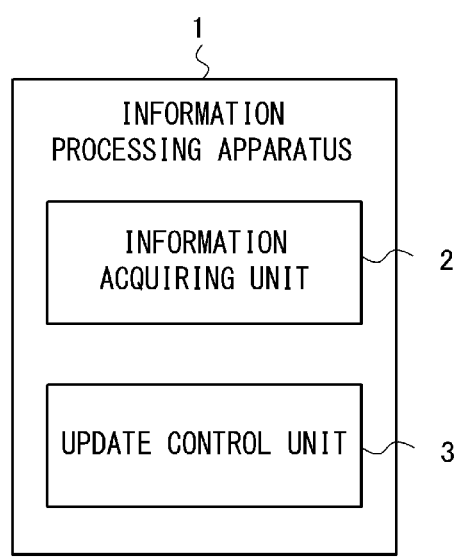
FIG. 1 is a block diagram illustrating one example of a configuration of an information processing apparatus according to an outline in one example embodiment.

Before describing the details of each example embodiment, an overview of an example embodiment will be described. FIG. 1 is a block diagram illustrating one example of a configuration of an information processing apparatus 1 according to an outline in one example embodiment. As shown in FIG. 1, the information processing apparatus 1 includes an information acquiring unit 2 and an update control unit 3.

The information acquiring unit 2 acquires redundant configuration information contained in network definition information from the MANO implementation apparatus. The MANO implementation apparatus is an apparatus configured to perform instantiation of a network functions by using network definition information that contains the redundant configuration information, which is information about a redundant configuration of the network functions, and implement MANO for the network functions. The network functions refer to specifically a VNF, for example, but a Container Network Function (CNF) is also applicable.

The update control unit 3 is configured to propose an update sequence of nodes in updating software of the nodes that execute processing for providing the network functions based on the redundant configuration information acquired by the information acquiring unit 2.

In this manner, the information processing apparatus 1 acquires information about what kind of a redundant configuration the network functions have, and proposes an update sequence based on the acquired information. This allows an operator (user) to understand the appropriate update sequence considering the redundant configuration. Therefore, even if the network function has a redundant configuration, the software of the nodes can be updated appropriately. Therefore, the impact on services can be suppressed and the improvement of the quality of updating work is achieved.

Details of Example Embodiment

Figure 2:
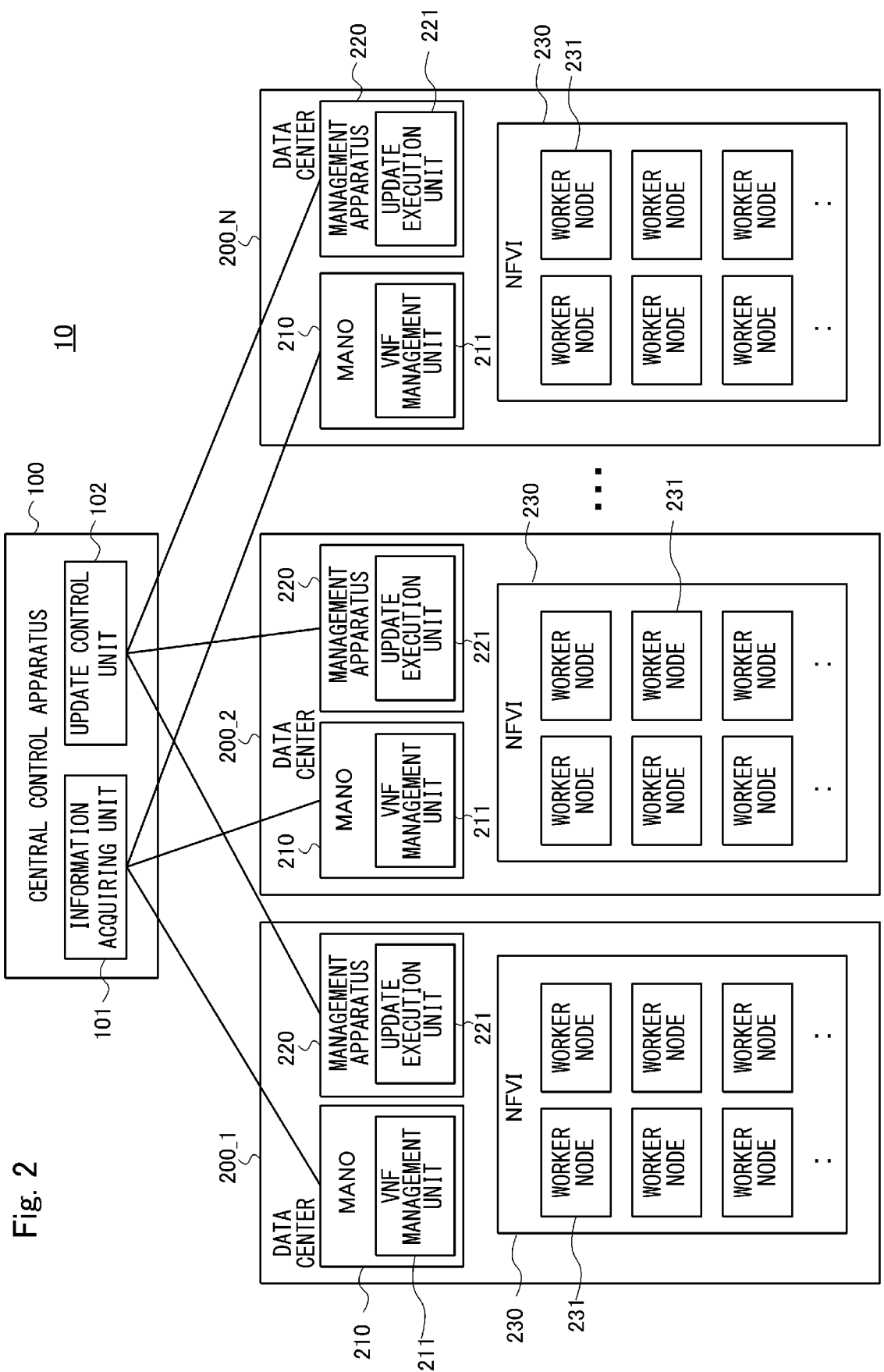
FIG. 2 is a block diagram illustrating one example of a configuration of an information processing system according to the example embodiment.

The details of the example embodiment will now be described. FIG. 2 is a block diagram illustrating one example of a configuration of an information processing system 10 according to the example embodiment. In the example illustrated in FIG. 2, information processing system 10 includes data centers 200_1, 200_2, . . . , 200_N and central control apparatus 100. In the following description, when referring to the data centers 200_1, 200_2, . . . , 200_N without particular distinction, they will be referred to as data center 200. Note that, in FIG. 2, the configuration related to the features of the example embodiment is illustrated, and other configurations are omitted as appropriate.

The data center 200 is a facility that stores physical resources for the VNF and has a MANO 210, a management apparatus 220, and a NFVI 230. Note that any number of data centers 200 is applicable. That is, N is an integer greater equal to or greater than 1. However, if the redundant configuration using different data centers 200 is employed, the number of data centers 200 is two or more. In this case, respective data centers 200 are located in different geographic regions.

MANO 210 is a node including a VNF management section 211 that provides management of hardware resources and software resources, as well as VNF management functions and orchestration functions. The VNF management section 211 specifically includes NFVO (Network Function Virtualization (NFV) Orchestrator), VNFM (VNF Manager), and VIM (Virtualized Infrastructure Manager). The NFVO is responsible for integrated operational management of the entire system by performing lifecycle management (for example, creation, monitoring, operation, and deletion) of network services composed of a plurality of VNFs. The VNFM is responsible for managing the resource requirements needed by the VNF and for managing the lifecycle of the VNF. The VIM is responsible for the operational management of physical resources and virtual resources.

Deployment of the NS or the VNFs (that is, NS/VNF Instantiation) is performed by the MANO 210 primarily using VNF Descriptors as defined in ETSI GS NFV-IFA 011. Note that, except for Nested NS, each of NSs or VNFs cannot be deployed across NFVIs.

The MANO 210 is a node corresponding to the MANO implementation apparatus described above and performs instantiation of VNFs using the VNF descriptors that include redundant configuration information, which is information about the redundant configurations of VNFs. In the example embodiment, specifically, the MANO 210 performs instantiation of VNFs (in other words, deployment of VNFs) using VNF descriptors defined in ETSI GS NFV-IFA 011, the VNF descriptors being extended to include redundant configuration information. Here, the VNF descriptors correspond to the network definition information described above. The VNF descriptors is hereinafter referred to as VNFD. The details of the redundant configuration information will be described later.

The NFVI 230 is an infrastructure for providing VNFs and includes a plurality of worker nodes 231. The number of worker nodes included in the NFVI 230 may be different in each data center 200. Worker node 231 is a physical server and executes various software to provide the VNFs. Worker node 231 is a specific example of a node that executes processing for providing the VNFs. The example embodiment describes technologies for updating the software of the platform, that is, the software of the worker node 231.

The management apparatus 220 is a node for controlling the software update process in the data center 200 and has an update execution unit 221. The update execution unit 221 executes the processes necessary to update the software. In other words, the update execution unit 221 is a processing unit configured to perform the software update processing for worker nodes 231. The update execution unit 221, for example, executes the software update processing according to the instructions of an update control unit 102 of the central control apparatus 100, which will be described below.

The central control apparatus 100 corresponds to the information processing apparatus 1 in FIG. 1 and manages the redundant configuration of VNFs for updating the software of worker nodes 231. The central control apparatus 100 is communicatively connected to the MANO 210 and the management apparatus 220 in each data center 200 by wired or wireless means. The central control apparatus 100 has an information acquiring unit 101 and the update control unit 102. The information acquiring unit 101 corresponds to the information acquiring unit 2 in FIG. 1 and acquires the redundant configuration information contained in the VNFD from MANO 210 in each data center 200. The update control unit 102 also proposes an update sequence for worker nodes 231 in updating the software of worker nodes 231 based on the redundant configuration information. For example, the update control unit 102 proposes the order of the data centers 200 in which update of the worker nodes 231 are performed, and the order of update of the worker nodes 231 in the data centers 200.

Here, the understanding of the redundant configurations is discussed. A redundant configuration within a single NFVI may be inferred to some extent from the parameter values "vdu", "autoScale", "vipCpd" and "deploymentFlavour" (hereafter referred to as DF), which are attributes defined in the VNFD. However, the exact redundant configuration at the Application Layer of NS/VNF cannot be understood from existing specifications.

In addition, the following three methods are possible to provide regional redundancy to NSs or VNFs by performing the instantiation of the NSs or the VNFs across NFVIs.

A first method (method a) is a method using a Distributed Computes Nodes (DCN) function of OpenStack, which is a cloud infrastructure software, and the like, to deploy NSs or VNFs in a plurality of regions (a plurality of data centers) using a single VNFD.

A second method (method b) is a method to deploy NSs or VNFs in NFVIs in respective independent regions (data centers) using separate VNFDs, respectively.

A third method (method c) is a method to deploy NSs or VNFs on OpenStack Platforms (OSPs) in respective independent regions (data centers) using Nested Network Service Descriptor (Nested NSD).

In the case of the method a, redundant configurations cannot be understood with the existing ETSI NFV specifications since this is logically the same as the case of redundant configurations within a single NFVI described above. In the case of method b, MANO will recognize that each instantiated VNF is a different VNF since respective VNFDs have no interrelation. Therefore, the redundant configuration cannot be understood by the method b either. Furthermore, in the case of method c, although it is possible to specify a NFVI of the deployment destination for each of NSs, the NSD and VNFD do not include information indicating that those NSs are designed to have a redundant configuration, so the redundant configuration cannot be understood in this case as well.

In contrast, in the example embodiment, the redundant configuration can be understood in any of the above cases by using VNF descriptors extended to include the redundant configuration information.

In the example embodiment, the redundant configuration information contains information about whether a redundant configuration composed of worker nodes 231 in the same data center 200 exists, and information about whether a redundant configuration composed of worker nodes 231 in data centers 200 in different regions exists. When there is no need to understand about the redundant configuration composed of worker nodes 231 in data centers 200 in different regions, the redundant configuration information may only be information about whether the redundant configuration composed of worker nodes 231 in the same data center 200 exists. Likewise, when there is no need to understand about the redundant configuration composed of worker nodes 231 in the same data center 200, the redundant configuration information may only be information about whether a redundant configuration composed of worker nodes 231 in the data centers 200 in the different regions exists.

The information regarding whether a redundant configuration composed of the worker nodes 231 in the same data center 200 exists will be specifically described below. In the example embodiment, adding an attribute shown in FIG. 3 to the information element about a Virtual Deployment Unit (VDU) in the VNFD makes it possible to understand the redundant configuration of the VNFC (VNF Component), which is a component of the VNF, in the data center 200 can be understood. In other words, in the example embodiment, in order to make it possible to detect whether configuration redundancy is taking place within a single NFVI230, the attribute value "redundantInstance" shown in FIG. 3 is added to the VNFD. Note that each VNFC used for the redundant configuration within the data center 200 shall use the same VDU. The VDU is a fundamental component of a VNF and corresponds to a VM having a network function.

The attribute value "redundantInstance" is an attribute value given for each VDU, specifically, it is an identifier indicating that the VNFC using the VDU in question constitutes a redundant configuration. The attribute value "redundantInstance" may take a value, true or false. If the value of the attribute "redundantInstance" is true, a VNFC for which the instantiation is performed by using the VDU in question shall be treated as having 1+N redundant configuration. This means that the VNFC using a VDU with this attribute value being true is deployed as having a redundant configuration within the data center 200.

In this manner, the redundant configuration information may be information contained in the VNFD as an attribute value for each VDU, which is an attribute indicating whether the VNFC using the VDU in question constitutes a redundant configuration. In other words, such redundant configuration information may be used as information indicating whether a redundant configuration composed of the worker nodes 231 in the same data center 200 exists.

Next, the information regarding whether a redundant configuration composed of the worker nodes 231 in the data centers 200 in different regions exist will be specifically described below. In the example embodiment, adding attributes shown in FIG. 4 to the information element about the DF in the VNFD makes it possible to understand the redundant configuration in different regions (data center 200) established by using different VNFDs. In other words, in the example embodiment, in order to make it possible to detect whether configuration redundancy is taking place by using data centers 200 in the different regions, the attribute values "geoRedundancy" and "geoRedundancyVNFdid" shown in FIG. 4 are added to the VNFD.

The attribute value "redundantInstance" is an attribute value given for each DF. In other words, the attribute value "redundantInstance" is an attribute value given for each VNF. Since an NS is composed of a plurality of VNFs, the attribute value exists as many VNFs as the number of VNFs that make up the NS. The attribute value is specifically an identifier that indicates whether a regional redundant configuration exists between different NFVIs with a value of true or false, where a value of true indicates that such a redundant configuration exists, and an attribute value of "geoRedundancyVNFdid is also provided.

The attribute value "geoRedundancyVNFdid" indicates the VNFD identifier used for instantiation to identify redundancy between different NFVIs. In other words, the attribute value "geoRedundancyVNFdid" is an attribute value that identifies the corresponding VNFD. In other words, the attribute value "geoRedundancyVNFdid" can be used to identify which VNF and which VNF constitute a redundant configuration.

In this manner, the redundant configuration information may be information contained in the VNFD as an attribute value for each VNF(DF), which is an attribute indicating whether a redundant configuration using different NFVIs for the VNF in question exists. If a redundant configuration using different NFVIs exist, the redundant configuration information may further include an identifier of the VNFD for performing instantiation of other VNFs that constitute the redundant configuration. In other words, such redundant configuration information may be used as information indicating whether a redundant configuration composed of the worker nodes 231 in the data centers 200 in different regions exist.

Although the redundant configuration for each VNFC cannot be understood from the attribute values described above, it is possible to understand the redundant configuration for each VNF, which allows formulation of an NFVI update plan that maintains service continuity.

The information acquiring unit 101 of the central control apparatus 100 acquires the attribute values shown in FIGS. 3 and 4 from each MANO 210 when the MANO 210 performs VNF instantiation using VNFD. This allows the information acquiring unit 101 to acquire information for identifying the redundant configuration of the NSs or the VNFs within the data center 200 and between different data centers 200.

The update control unit 102 of the central control apparatus 100 proposes an update sequence for the data centers 200 and worker nodes 231 based on the information acquired by the information acquiring unit 101. In other words, the update control unit 102 proposes which data center 200 to start updating from and which worker node 231 in the data center 200 targeted for update to start updating. Specifically, the update control unit 102 creates a plan for the update sequence and outputs the created plan. The output may be displayed on a display or transmitted to any terminal communicatively connected to the central control apparatus 100. The update control unit 102 may create a plurality of plans and output the plurality of plans. The operator, referring to the output plan, inputs instructions specifying the update sequence to the central control apparatus 100. This input can be given to the central control apparatus 100 in any way. For example, this input may be made via an input apparatus connected to the central control apparatus 100 or via any of the terminals described above. The instruction to specify the update sequence may be an instruction to approve the output plan, an instruction to select one of the plans, or an instruction to modify the proposed update plan.

The update control unit 102 instructs the management apparatus 220 of the data center 200 on a sequence of the worker nodes 231 to be updated according to the update plan (update sequence) determined by the input instruction. The update execution unit 221 of the management apparatus 220 executes software update processing for the worker nodes 231 in sequence in accordance with the instruction.

The update sequence proposed by the update control unit 102 will now be described. The update control unit 102 may create a plan for the update sequence according to the parameters N1 and N2 as follows. As used herein, N1 indicates the number of data centers 200 to be updated at the same time. Also, N2 indicates the number of worker nodes 231 that can be updated at the same time. The updating may be done sequentially rather than completely in parallel among a plurality of worker nodes 231. In other words, N2 can be said to be the number of worker nodes 231 to be updated in parallel or sequential updates. The value of N1 should be set by an operator, for example, considering the risk of failure and the period of time available for update. The value of N2 is set by the operator, for example, to a value equal to or smaller than an upper limit value based on technical limitations.

The update control unit 102 proposes an update sequence that satisfies the constraints specified by the parameters N1 and N2, while satisfying the following conditions. The update control unit 102 does not necessarily have to use the parameters N1 and N2. Although it is preferable for the update control unit 102 to propose an update sequence that satisfies all of the following conditions, it may propose an update sequence that satisfies any combination of conditions, or it may propose an update sequence that satisfies any one of the conditions.

Condition A

The update sequence shall be such that the data center 200 with the least number of deployed VNFCs is selected first. The update sequence shall be such that the worker node 231 with the least number of deployed VNFCs is selected first.

In this case, the update control unit 102 would determine the sequence of the data centers 200 in which the worker nodes 231 are updated based on the total number of VNFCs implemented by the worker nodes 231 in the data center 200. In other words, the update control unit 102 determines the update sequence of worker nodes 231 on the data center 200 basis based on the total number of VNFCs implemented by worker nodes 231 in the data center 200. In this case, the update control unit 102 would determine the update sequence for worker nodes 231 based on the number of VNFCs implemented by each worker node 231. This will suppress the risk of update failures. Note that the number of deployed VNFCs is managed by the MANO 210, and when the update sequence is proposed to satisfy this condition, the information acquiring unit 101 acquires the number of VNFCs from the MANO 210.

Condition B

Two or more data centers 200 in different regions that compose a redundant configuration are not subject to update at the same time.

In other words, in this case, the update control unit 102 proposes an update sequence such that worker nodes 231 are not updated at the same time in two or more data centers 200 used in the redundant configuration composed of worker nodes 231 of the data centers 200 in different regions. In other words, in this case, the update control unit 102 would propose an update sequence other than those in which the worker nodes 231 in two or more such data centers 200 are updated at the same time. In this case, the information acquiring unit 101 queries the MANO 210 to identify the data center 200 in which the VNF for which the instantiation has been performed by using the VNFD specified in "geo-RedundancyVNFdid" exists, thereby identifying the data center 200 in a redundancy relationship. In this way, the update can be implemented with regional redundant configuration in mind.

Condition C

Two or more worker nodes 231 that construct a redundant configuration in the same data center 200 are not subject to update at the same time.

In other words, in this case, the update control unit 102 proposes an update sequence that does not update two or more worker nodes 231, which are used in a redundant configuration composed of worker nodes 231 in the same data center 200, and which are in a redundant relationship with each other at the same time. In other words, in this case, the update control unit 102 would propose an update sequence other than those in which such two or more worker nodes 231 are updated at the same time. In this case, the information acquiring unit 101 identifies a worker node 231 in a redundant relationship by querying the MANO 210 and identifying a worker node 231 in which a VNFC deployed by using a VDU, whose "redundantInstance" is true. In this way, the update can be implemented taking into account the redundant configuration within the data center 200.

Condition D

The data centers 200 in different regions that compose a redundant configuration, that is, the data centers 200 that are in a redundant relationship are not subject to updates in succession.

In other words, in this case, the update control unit 102 proposes an update sequence such that data center 200, which is in a redundant relationship, does not become, in succession, a data center where the worker nodes 231 are to be updated. In other words, in this case, the update control unit 102 would propose an update sequence other than the update sequence in which such data center 200 would be, in succession, a data center in which the worker nodes 231 are to be updated. This enables updates that take into account the switching timing of workloads on the NS or VNF and the operation check period after switching. In other words, it is possible to implement updates so that there are no obstacles to the handover of service provision at the time of the update and the confirmation of the handover, which is performed between VNFs in a redundant relationship.

Condition E

The worker nodes 231 that constitute a redundant configuration in the same data center 200, that is, the worker nodes 231 that have a redundant relationship are not subject to updates in succession.

In other words, in this case, the update control unit 102 proposes an update sequence that does not update the worker nodes 231 in a redundant relationship in succession. In other words, in this case, the update control unit 102 would propose an update sequence other than those in which such worker nodes 231 are updated in succession. This enables updates that take into account the switching timing of workloads on the NS or VNF and the operation check period after switching in the same manner as Condition D. It also prevents workload switching from occurring in alternating succession.

Figure 5:
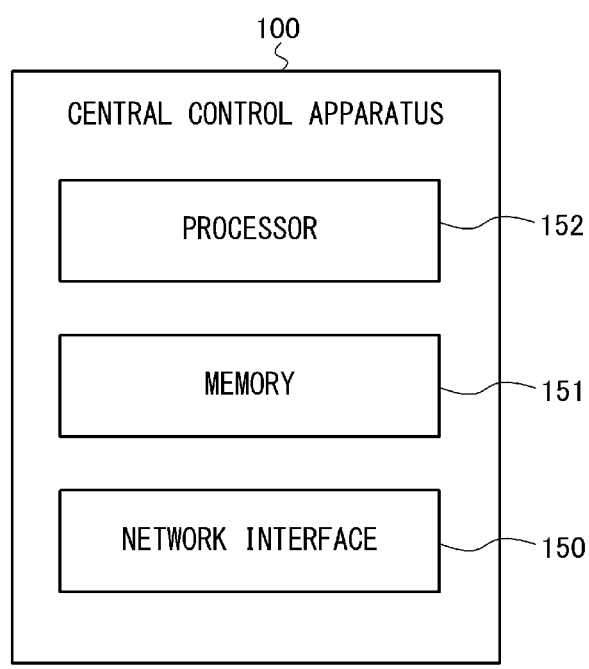
FIG. 5 is a block diagram illustrating one example of a hardware configuration of a central control apparatus according to the example embodiment.

Next, one example of the hardware configuration of the central control apparatus 100 will be described. FIG. 5 is a block diagram illustrating one example of a hardware configuration of a central control apparatus 100. The central control apparatus 100, for example, includes a network interface 150, memory 151, and processor 152, as illustrated in FIG. 5.

The network interface 150 is used to communicate with other apparatuses (for example, the MANO 210 and the management apparatus 220). The network interface 150 may include, for example, a network interface card (NIC).

The memory 151 is, for example, composed of a combination of a volatile memory and a nonvolatile memory. The memory 151 is used to store software (computer programs) containing one or more instructions and data required for processing, which are executed by processor 152.

The processor 152 reads software (computer program) from the memory 151 and executes it for processing of the central control apparatus 100.

The processor 152 may be, for example, a microprocessor, a MPU (Micro Processor Unit), or a CPU (Central Processing Unit). The processor 152 may include a plurality of processors.

In this manner, the central control apparatus 100 functions as a computer. Note that the MANO 210, the management apparatus 220, and the worker nodes 231 may likewise be computers having the configuration illustrated in FIG. 5. In other words, the processing of the MANO 210, the management apparatus 220, and the worker nodes 231 may be achieved in each apparatus by the processor reading and executing software (computer program) containing one or more instructions stored in the memory.

The programs described above can be stored using various types of non-transitory computer-readable media and supplied to a computer. The non-transitory computer-readable media include various types of tangible storage media. Examples of the non-transitory computer-readable media include, for example, magnetic recording media (for example, flexible discs, magnetic tapes, hard disk drives), magneto-optical recording media (for example, magneto-optical disks), CD-ROMs (Read Only Memories), CD-R/W, semiconductor memories, (for example, mask ROMs, PROMs (Programmable ROMs), EPROMs (Erasable PROMs), flash ROMs, RAMs (Random Access Memories)). The program may also be supplied to the computer by various types of transitory computer-readable media. Examples of the transitory computer-readable media include electric signals, optical signals, and electromagnetic waves. The transitory computer-readable media may provide the programs to the computers via wired communication paths such as wires and optical fibers, or via wireless communication paths.

Figure 6:
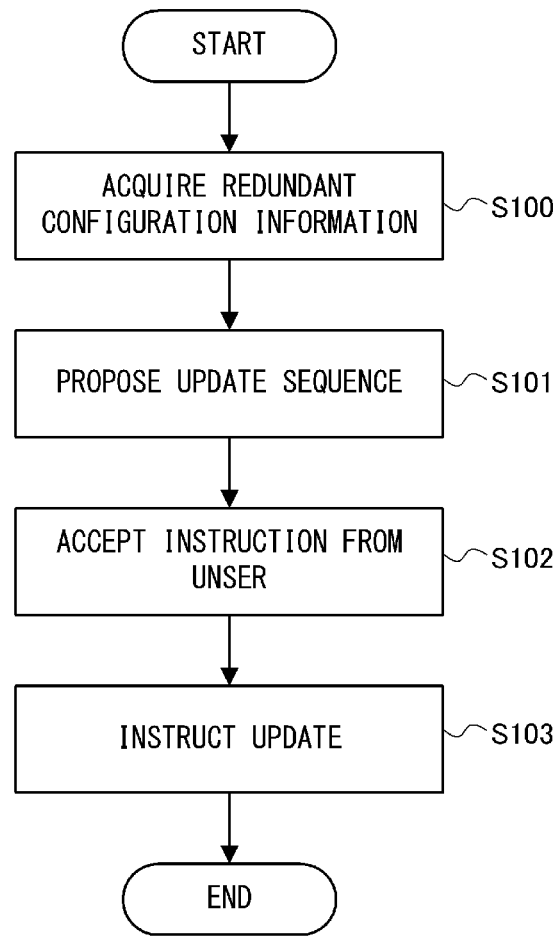
FIG. 6 is a flowchart illustrating one example of a flow of an operation of the central control apparatus according to the example embodiment.

Next, a flow of update control by the central control apparatus 100 is described. FIG. 6 is a flowchart showing one example of a flow of operations of the central control apparatus 100. An example of operation will be described below referring to FIG. 6.

In Step S100, the information acquiring unit 101 acquires redundant configuration information from the MANO 210.

Next, in Step S101, the update control unit 102 proposes an update sequence based on the information acquired in Step S100.

Next, in Step S102, the update control unit 102 receives an instruction to specify an update sequence from the operator (user) who has referred to the update sequence proposed in Step S101.

Next, in Step S103, the update control unit 102 instructs the management apparatus 220 to update the worker nodes 231 according to the update sequence specified in Step S102.

In this manner, the central control apparatus 100 acquires redundant configuration information and proposes an update sequence based on the acquired information. Therefore, even if the NS or VNF has a redundant configuration, the software of the worker nodes 231 can be updated appropriately.

The present invention has been described with reference to example embodiments thus far, but the present invention is not limited to the example embodiments described above. Various changes may be made to the configurations and details of the present invention that may be understood by those skilled in the art within a scope of the present disclosure.

For example, a warning may be issued if VNF instantiation is performed by resources (for example, CPU, RAM, storages, NICs, or the like) that are insufficient to perform VNF hardware healing. The invention of the present application is not limited to cases where network functions are used in virtual machines, but is also applicable to cases where network functions are used in containers.

Some or all of the example embodiments described above may be described as, but not limited to, the following Supplementary notes.

Supplementary Note 1

An information processing apparatus including:
information acquiring means for acquiring redundant configuration information contained in network definition information from a Management and Orchestration (MANO) implementation apparatus performing instantiation of network functions by using the network definition information that contains the redundant configuration information being information about a redundant configuration of the network functions, and implementing MANO for the network functions; and
update control means for proposing an update sequence of nodes in updating software of the nodes that execute processing for providing the network functions, based on the redundant configuration information.

Supplementary Note 2

The information processing apparatus according to Supplementary note 1, in which the redundant configuration information contains information about whether a redundant configuration composed of the nodes within the same data center exists.

Supplementary Note 3

The information processing apparatus according to Supplementary note 1 or 2, in which the redundant configuration information contains information about whether a redundant configuration composed of the nodes in data centers in different regions exists.

Supplementary Note 4

The information processing apparatus according to Supplementary note 2, in which the update control means proposes an update sequence in which two or more of the nodes being used for constructing a redundant configuration composed of the nodes within the same data center are not updated at the same time.

Supplementary Note 5

The information processing apparatus according to Supplementary note 4, in which the update control means proposes an update sequence that does not update the two or more of the nodes in succession.

Supplementary Note 6

The information processing apparatus according to Supplementary note 3, in which the update control means proposes an update sequence in which updates of the nodes are not performed at the same time in two or more of data centers being used in a redundant configuration composed of the nodes in the data centers in different regions.

Supplementary Note 7

The information processing apparatus according to Supplementary note 6, in which the update control means proposes an update sequence in which the two or more of the data centers do not become, in succession, data centers in which the node updates are performed.

Supplementary Note 8

The information processing apparatus according to any one of Supplementary notes 1 to 7, in which the update control means determines a sequence of the data centers in which the node updates are performed, based on a total number of network functional components implemented by the nodes in the data centers.

Supplementary Note 9

The information processing apparatus according to any one of Supplementary notes 1 to 8, in which the update control means determines an update sequence of the nodes, based on the number of network functional components implemented by the nodes.

Supplementary Note 10

An information processing system including:
a MANO implementation apparatus configured to perform instantiation of network functions by using network definition information containing redundant configuration information being information about a redundant configuration of the network functions, and implement MANO for the network functions; and
an information processing apparatus, wherein the information processing apparatus includes:
an information acquiring means for acquiring the redundant configuration information contained in the network definition information from the MANO implementation apparatus, and
an update control means for proposing an update sequence of nodes in updating software of the nodes that execute processing for providing the network functions, based on the redundant configuration information.

Supplementary Note 11

The information processing system according to Supplementary note 10, in which the redundant configuration information contains information about whether a redundant configuration composed of the nodes within the same data center exists.

Supplementary note 12

The information processing system according to Supplementary note 10 or 11, in which the redundant configuration information contains information about whether a redundant configuration composed of the nodes in data centers in different regions exists.

Supplementary Note 13

An updating method including:
acquiring redundant configuration information contained in network definition information from a MANO implementation apparatus performing instantiation of network functions by using the network definition information that contains the redundant configuration information being information about a redundant configuration of the network functions, and implementing MANO for the network functions, and
proposing an update sequence of nodes in updating software of the nodes that execute processing for providing the network functions based on the redundant configuration information.

Supplementary Note 14

A non-transitory computer-readable medium storing a program causing a computer to execute:
an information acquiring step of acquiring redundant configuration information contained in network definition information from a MANO implementation apparatus performing instantiation of network functions by using the network definition information that contains the redundant configuration information being information about a redundant configuration of the network functions, and implementing MANO for the network functions; and
an update control step of proposing an update sequence of nodes in updating software of the nodes that execute processing for providing the network functions, based on the redundant configuration information.

REFERENCE SIGNS LIST

1 INFORMATION PROCESSING APPARATUS
2 INFORMATION ACQUIRING UNIT
3 UPDATE CONTROL UNIT
10 INFORMATION PROCESSING SYSTEM
100 CENTRAL CONTROL APPARATUS
101 INFORMATION ACQUIRING UNIT
102 UPDATE CONTROL UNIT
150 NETWORK INTERFACE
151 MEMORY
152 PROCESSOR
200 DATA CENTER
210 MANO
211 VNF MANAGEMENT UNIT
220 MANAGEMENT APPARATUS
221 UPDATE EXECUTION UNIT
230 NFVI
231 WORKER NODE

What is claimed is:
1. An information processing apparatus comprising:
at least one memory storing instructions; and
at least one processor configured to execute the instructions to:
acquire redundant configuration information contained in network definition information from a Management and Orchestration (MANO) implementation apparatus, the MANO implementation apparatus performing instantiation of network functions by using the network definition information that contains the redundant configuration information and implementing MANO for the network functions, the redundant configuration information being information about a redundant configuration of the network functions; and propose an update sequence of nodes in updating software of the nodes that execute processing for providing the network functions, based on the redundant configuration information.

2. The information processing apparatus according to claim 1, wherein the redundant configuration information contains information about whether a redundant configuration composed of the nodes within a same data center exists.

3. The information processing apparatus according to claim 1, wherein the redundant configuration information contains information about whether a redundant configuration composed of the nodes in data centers in different regions exists.

4. The information processing apparatus according to claim 2, wherein the processor is further configured to execute the instructions to propose the update sequence in which two or more of the nodes being used for constructing a redundant configuration composed of the nodes within the same data center are not updated at the same time.

5. The information processing apparatus according to claim 4, wherein the processor is further configured to execute the instructions to propose the update sequence that does not update the two or more of the nodes in succession.

6. The information processing apparatus according to claim 3, wherein the processor is further configured to execute the instructions to propose the update sequence in which updates of the nodes are not performed at the same time in two or more data centers being used in a redundant configuration composed of the nodes in the data centers in different regions.

7. The information processing apparatus according to claim 6, wherein the processor is further configured to execute the instructions to propose the update sequence in which the two or more of the data centers do not become, in succession, data centers in which node updates are performed.

8. The information processing apparatus according to claim 1, wherein the processor is further configured to execute the instructions to determine a sequence of data centers in which node updates are performed, based on a total number of network functional components implemented by the nodes in the data centers.

9. The information processing apparatus according to claim 1, wherein the processor is further configured to execute the instructions to determine the update sequence of the nodes, based on a number of network functional components implemented by the nodes.

10. An updating method performed by a computer and comprising:
acquiring redundant configuration information contained in network definition information from a MANO implementation apparatus, the MANO implementation apparatus performing instantiation of network functions by using the network definition information that contains the redundant configuration information and implementing MANO for the network functions, the redundant configuration information being information about a redundant configuration of the network functions; and proposing an update sequence of nodes in updating software of the nodes that execute processing for providing the network functions, based on the redundant configuration information.

11. The updating method according to claim 10, wherein the redundant configuration information contains information about whether a redundant configuration composed of the nodes within a same data center exists.

12. The updating method according to claim 10, wherein the redundant configuration information contains information about whether a redundant configuration composed of the nodes in data centers in different regions exists.

13. The updating method according to claim 11, wherein the update sequence in which two or more of the nodes being used for constructing a redundant configuration composed of the nodes within the same data center are not updated at the same time is proposed.

14. The updating method according to claim 13, wherein the update sequence that does not update the two or more of the nodes in succession is proposed.

15. The updating method according to claim 12, wherein the update sequence in which updates of the nodes are not performed at the same time in two or more of data centers being used in a redundant configuration composed of the nodes in the data centers in different regions is proposed.

16. The updating method according to claim 15, wherein the update sequence in which the two or more of the data centers do not become, in succession, data centers in which node updates are performed is proposed.

17. The updating method according to claim 10, wherein the updating method comprises determining a sequence of data centers in which node updates are performed, based on a total number of network functional components implemented by the nodes in the data centers.

18. The updating method according to claim 10, wherein the updating method comprises determining the update sequence of the nodes, based on a number of network functional components implemented by the nodes.

19. A non-transitory computer-readable medium storing a program causing a computer to execute:
acquiring redundant configuration information contained in network definition information from a MANO implementation apparatus, the MANO implementation apparatus performing instantiation of network functions by using the network definition information that contains the redundant configuration information and implementing MANO for the network functions, the redundant configuration information being information about a redundant configuration of the network functions; and proposing an update sequence of nodes in updating software of the nodes that execute processing for providing the network functions, based on the redundant configuration information.

20. The non-transitory computer-readable medium according to claim 19, wherein the redundant configuration information contains information about whether a redundant configuration composed of the nodes within a same data center exists.

* * * * *